Oct. 25, 1949.     E. M. DOWD     2,485,713
SEED HARVESTER
Filed Sept. 14, 1945
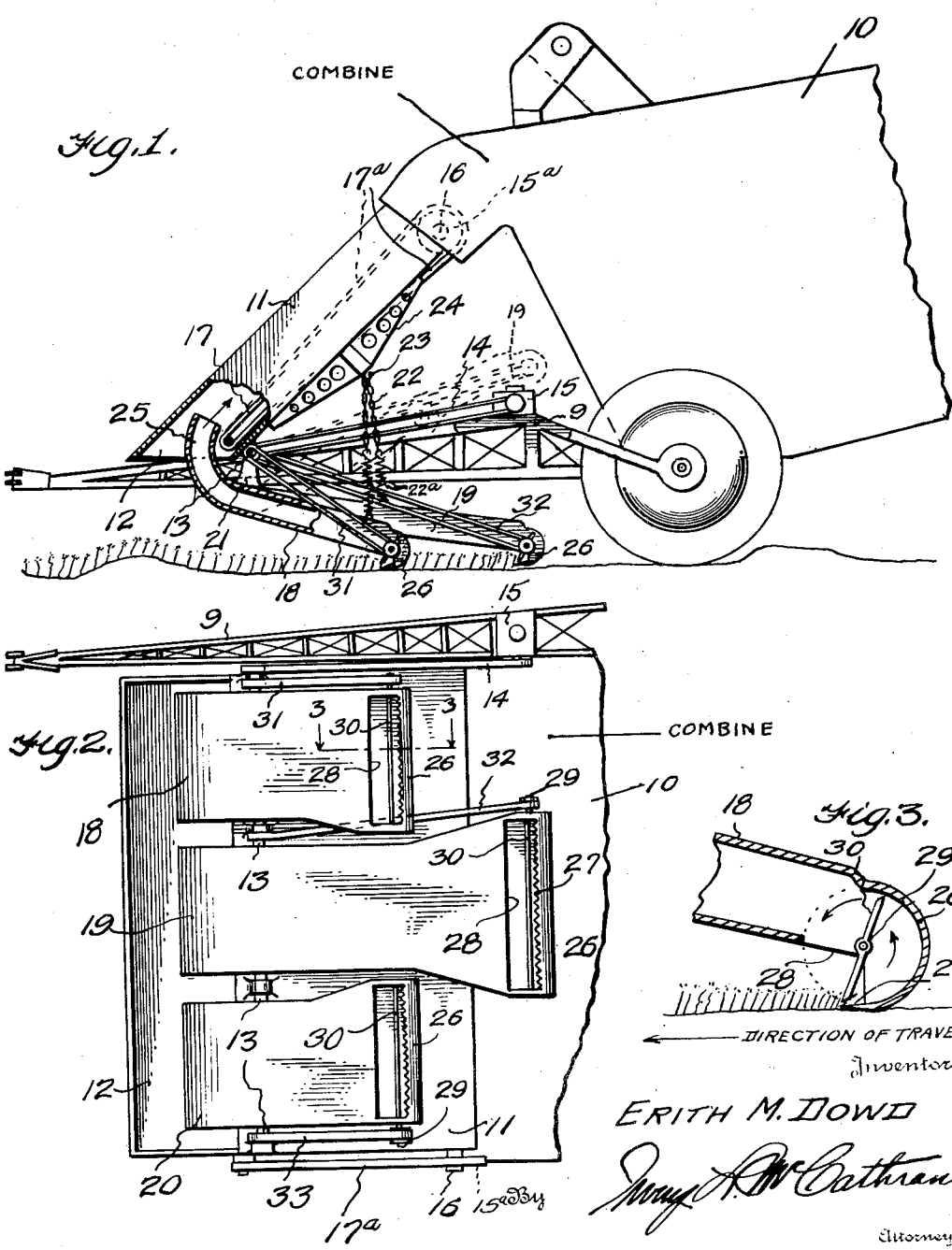
Inventor
ERITH M. DOWD Patented Oct. 25, 1949

2,485,713

UNITED STATES PATENT OFFICE 2,485,713

SEED HARVESTER

Erith M. Dowd, Lakin, Kans.

Application September 14, 1945, Serial No. 616,209

4 Claims. (Cl. 56—23)

This invention relates to harvesters and more particularly to a harvester for harvesting buffalo grass seed.

One of the important objects of this invention is the production of a harvester unit which is hingedly mounted for vertical swinging adjustment to accommodate itself to uneven surfaces of the ground over which the unit passes while closely following the contour of the ground for the purpose of cutting the seed, grain or the like.

A further object of this invention is the production of a simple and efficient seed harvester having a plurality of harvester sickle units, the cutting portions of which are arranged in staggered relation so as to cut a continuous swath for the full width of all of the units.

Another object of this invention is the production of a grass seed harvester for use with combines of the well-known types, wherein the harvester units are hung for vertical swinging adjustment below the inclined conveyor platform of the combine for following the contour of the ground to cut the grass close to the ground.

Other objects and advantages of the present invention will appear throughout the following specification and claims.

In the drawing:

Figure 1 is a side elevational view of the improved harvester;

Figure 2 is a bottom plan view of the inclined conveyor platform, illustrating the relative locations of the harvester units;

Figure 3 is an enlarged longitudinal sectional view taken on line 3—3 of Figure 2, and illustrating the cutting mechanism of the harvester unit.

By referring to the drawing, it will be seen that 10 designates the conventional combine, wherein the combine carries an inclined conveyor platform 11 having a lower intake open end 12 preferably about 18 inches above the surface of the ground. A harvester unit supporting shaft 13 is hung upon the rear face of the platform 11 in any suitable manner and this shaft 13 is driven from a drive belt 14, which belt 14 is in turn driven from the engine 15 carried by the combine tongue 9 of the combine 10. The conveyor 17 is driven by a belt 17ª. The belt 17ª is driven by a pulley 15ª carried by a shaft 16. The belt 17ª is the conventional conveyor belt which is carried by the inclined platform 11.

A plurality of harvester units 18, 19 and 20 are hung from the shaft 13 by means of suitable hangers such as the hanger 21, shown in Figure 1, so that these units may be swung from an operative position shown in full lines to an inoperative position shown in dotted lines. These units 18, 19 and 20 may be vertically adjusted to suit the contour of the ground and suspended in an adjusted or raised position by means of suitable adjustable suspending chains 22 which engage these units and are detachably secured to a suitable engageable hook 23 carried by the brace 24 of the platform 11. A spring 22ª is suspended from each chain 22 and these springs 22ª are attached to the respective units 18, 19 and 20 to yieldably suspend said units.

It should be noted that this shaft 13 and the hangers, such as the hanger 21, provide a hinge support for the forward ends of the units 18, 19 and 20, to permit these units to be freely swung and thereby easily follow the contour of the ground over which the units pass. Each unit is provided with an upwardly curved discharge spout 25 similar to the spout of unit 18 shown in Figure 1. The spout 25, as do the similar spouts of the other units, extends into the lower open end 12 of the platform 11 adjacent the lower end of the conveyor 17 to discharge grain, grass seed, and the like, upon the conveyors 17 for delivery to the combine 10. The upwardly curved discharge spout of each unit will permit of a considerable vertical swinging adjustment of the units. Each unit comprises a hollow flat body extending from the discharge spout to the cutter head 26. Each cutter head 26 comprises a rigid sickle member 27 which extends in a forward direction within the entrance opening 28 of each cutter head 26 and in a position to ride over the surface of the ground in a manner shown in Figure 3.

A shaft 29 is carried transversely of each head 26 and a cutter blade 30 which also acts as a fan and beater is carried by each shaft 29. The blades 30 are adapted to rotate in the direction shown by the arrows in Figure 3 for beating the grass or grain against the combined fan and sickle member 27 as the harvester units travel in a forward direction. The grass, seed, or grain will then be driven around the heads 26 of harvester units and then up through the hollow flat bodies thereof and out through the spouts 25 upon the conveyor 17, due to the fact that the sickle members 27 fit relatively snugly in the heads 26 and constitute fans as well as sickle members to cut and fan or blow the light grass, seed or grain upwardly of the spouts 25. The shaft supporting the blade 30 of unit 18 is driven by a belt 31 from shaft 13. The shaft supporting the blade 30 of unit 19 is driven from a belt 32, and the shaft 13, while the blade 30 of the unit 20 is driven from a belt 33 and shaft 13.

The head 26 of the units 18 and 20 are inset relative to the head 26 of the unit 19 in staggered relation, as shown in Figure 2, and is widened to cause the ends of the intake opening 28 thereof to extend slightly laterally of the intake openings 28 of the units 18 and 20. The unit 19 is therefore widened at its head 26 toward each side thereof, and the heads 26 of the units 18 and 20 are widened inwardly toward the unit 19 to provide for an overlapping cutting area for the adjoining units so that a continuous swath may be cut for the combined width of the three units illustrated without missing an area between the respective units.

By considering the drawing, it will be noted that the harvesting units are hung below the inclined elevating platform 11 so that these harvesting elements are hingedly supported, each element having a spout 25 which extends upwardly into the lower end of the inclined elevating platform 11. The seed grass is cut by means of the fixed sickle member 27 in conjunction with the rotating blades 30, which blades beat the grass against the sickle 27 and then act as a fan or rotor for forcing the seed up through the harvesting units into the inclined elevating platform 11 and upon the conveyor belt 17. The rotating cutter blades 30 are operated by suitable belts described above, and these harvesting units are adapted to freely hang in a selected position so that the sickle element 27 may slide close to the surface of the ground and follow the contour thereof even though the surface should be undulated. The downward limit of the harvesting units may be gaged by the length of the chain or chains 22. The chains 22 may be adjusted in length by placing a selected link of the chain 22 upon the hook 23 to hold the units in an inoperative position and out of the way when moving the device from place to place.

Furthermore, it should be noted that I preferably employ three or more units 18, 19 and 20, the unit 19 being longer than the units 18 and 20, the rear end of the unit 19 being broader and the units 18 and 19 being so constructed as to provide a cutting swath equal to the width of the three units combined, as is shown clearly in Figure 2.

Certain detail changes in the construction may be employed without departing from the spirit of the invention, so long as such changes fall within the scope of the appended claims.

Having described the invention, what is claimed as new is:

1. In combination with a conveyor platform having a lower intake open end, a trailing hollow harvester unit hinged for vertical swinging movement near its forward end and attached near the lower intake open end of the conveyor platform, a conveyor element extending longitudinally of the conveyor platform and having a lower end extending to the intake open end of the platform, said hollow harvester unit having a forward upturned open discharge spout extending into the intake lower end of the conveyor platform, said spout overlying the lower end of said conveyor element for delivering material from the spout to the lower end of the conveyor element, said hollow harvester unit having a rear end defining a depending cutter head provided with a forwardly facing opening, and a combined fan and sickle member rotatably mounted in said head for beating grain, seed and the like, into the head and for blowing the grain seed and the like forwardly through the harvester unit, upwardly out of the spout and onto the lower end of the conveyor element.

2. In combination with a forwardly and downwardly inclined conveyor platform having a lower intake open end, a trailing hollow harvester unit hinged for vertical swinging movement near its forward end and attached near the lower intake open end of the conveyor platform and extending rearwardly of the lower intake end of the conveyor platform, a conveyor element extending longitudinally of the conveyor platform and having a lower end extending to the intake open end of the platform, said hollow harvester unit having a forward upturned open discharge spout extending into the intake lower end of the conveyor platform, said spout overlying the lower end of said conveyor element for delivering material from the spout to the lower end of the conveyor element, said hollow harvester unit having a rear end defining a depending cutter head provided with a forwardly facing opening, and a combined fan and sickle member rotatably mounted in said head for beating grain, seed and the like into the head and for blowing the grain, seed and the like forwardly through the harvester unit, upwardly out of the spout and onto the lower end of the conveyor element.

3. In combination with a forwardly and downwardly inclined conveyor platform having a lower intake open end, a trailing hollow harvester unit hinged for vertical swinging movement near its forward end and attached near the lower intake open end of the conveyor platform and extending rearwardly of the lower intake end of the conveyor platform, a conveyor element extending longitudinally of the conveyor platform and having a lower end extending to the intake open end of the platform, said hollow harvester unit having a forward upturned open discharge spout extending into the intake lower end of the conveyor platform, said spout overlying the lower end of said conveyor element for delivering material from the spout to the lower end of the conveyor element, said hollow harvester unit having a rear end defining a depending cutter head provided with a forwardly facing opening, a combined fan and sickle member rotatably mounted in said head for beating grain, seed and the like into the head and for blowing the grain, seed and the like forwardly through the harvester unit, upwardly out of the spout and onto the lower end of the conveyor element, and adjustable tension means suspending the rear end of the harvester unit from said platform to support the cutting head in a yieldable operative position.

4. In combination with a conveyor platform having a lower intake open end, a trailing hollow harvester unit hinged for vertical swinging movement near its forward end and attached near the lower intake open end of the conveyor platform, a conveyor element extending longitudinally of the conveyor platform and having a lower end extending to the intake open end of the platform, said hollow harvester unit having a forward upturned open discharge spout extending into the intake lower end of the conveyor platform, said spout overlying the lower end of said conveyor element for delivering material from the spout to the lower end of the conveyor element, said hollow harvester unit having a rear end defining a depending cutter head provided with a forwardly facing opening, and a combined fan and sickle member rotatably mounted in said head for beating grain, seed and the like, into the head and for blowing the grain, seed and the like forwardly through the harvester unit, upwardly out of the spout and onto the lower end of the conveyor element, a plurality of similarly constructed harvester units hingedly secured in substantially parallel relation to the first-mentioned unit, and one of the units having a relatively wide head portion extending rearwardly of the head portions of the other units and overlapping the swath cut by the other units to produce a cut swath through the standing grain equivalent to the combined width of all of the harvester units.

ERITH M. DOWD.

REFERENCES CITED

The following references are of record in the file of this patent:

UNITED STATES PATENTS

| Number | Name | Date |
|---|---|---|
| 1,347,733 | Davis | July 27, 1920 |
| 2,065,721 | Mutzbauer | Dec. 29, 1936 |
| 2,068,191 | Murphy | Jan. 19, 1937 |
| 2,209,625 | Jensen | July 30, 1940 |
| 2,349,386 | Stoetzl | May 23, 1944 |